United States Patent [19]

Kumar

[11] Patent Number: 5,323,095
[45] Date of Patent: Jun. 21, 1994

[54] PROPULSION AND ELECTRIC BRAKING SYSTEM FOR ELECTRIC TRACTION MOTOR VEHICLE

[75] Inventor: Ajith K. Kumar, Erie, Pa.

[73] Assignee: General Electric Company, Erie, Pa.

[21] Appl. No.: 693,743

[22] Filed: Apr. 30, 1991

[51] Int. Cl.$^5$ .............................................. H02P 3/14
[52] U.S. Cl. ....................................... 318/376; 318/152; 388/801; 388/907.2; 388/917
[58] Field of Search ................ 388/800–808, 388/907.2, 917–920; 318/139, 370, 375–381, 798–803, 758–759, 53, 60, 69, 59, 66, 68, 80, 71, 79, 89, 151–154

[56] References Cited

U.S. PATENT DOCUMENTS

| | | | |
|---|---|---|---|
| 3,569,811 | 4/1969 | Miller et al. | 318/381 |
| 4,044,285 | 8/1977 | Plunkett et al. | 318/803 |
| 4,088,934 | 5/1978 | D'Altre et al. | 318/802 |
| 4,093,900 | 6/1978 | Plunkett | 318/370 |
| 4,292,531 | 8/1981 | Williamson | 290/14 |
| 4,495,449 | 1/1985 | Black et al. | 318/60 |
| 4,761,600 | 8/1988 | D'Atre et al. | 318/759 |

*Primary Examiner*—William M. Shoop, Jr.
*Assistant Examiner*—David Martin
*Attorney, Agent, or Firm*—R. Thomas Payne; Marvin Snyder

[57] ABSTRACT

A system and method for controlling power transfer between an internal combustion driven electrical power generator and a direct current (DC) motor. In one form, the invention includes control of a power inverter in a manner to restrict current through a winding of the generator to a predetermined polarity. The inverter includes a plurality of gate controlled switching devices which are selectively energized to allow current to free wheel through the motor during at least some portion of each alternating voltage cycle of the generator. In another form, a plurality of resistors are connected in series with an inverter and a DC motor with each resistor including a switching device for bypassing current around the associated resistor. In this form, resistors can be selectively inserted into the series path during electrical braking so that a maximum amount of electrical energy can be transferred to the generator through the inverter without exceeding the voltage limits of the inverter during high speed braking. Regenerative braking is further maximized during low speed or reduced braking requirements by removing resistors from the series current path.

11 Claims, 3 Drawing Sheets

PROPULSION AND ELECTRIC BRAKING SYSTEM FOR ELECTRIC TRACTION MOTOR VEHICLE

This invention relates generally to electric propulsion systems for traction vehicles and, more particularly, to a system and method for controlling motor field and armature currents during vehicle operation.

BACKGROUND OF THE INVENTION

An electric propulsion system for a traction vehicle, such as a large haulage truck, typically comprises a prime mover-driven electric generating means for supplying electric power to a pair of high horsepower electric traction motors respectively connected in driving relationship to a pair of wheels on opposite sides of the vehicle. The prime mover is commonly a diesel engine, and the traction motors are generally adjustable speed, reversible direct current (DC) electric motors. A vehicle operator controls the vehicle speed and direction of travel, i.e., forward or reverse, by manipulation of a speed control pedal and a forward-reverse selector switch. This speed control pedal is adapted to control the engine speed (rpm) which determines the power output of the generating means, thus varying the magnitude of the voltage applied to the traction motors.

Deceleration of a moving vehicle is accomplished by releasing the speed control pedal and either allowing the vehicle to coast or activating its mechanical or electrical braking system. In the electric braking mode of operation, the motors behave as generators, and the magnitude of the voltage generated across the armature windings of each motor is proportional to the rotational speed and the field excitation current of the motor. Dynamic braking resistor grids are connected across the armatures of the respective motors to dissipate the electric power output of the motors during electric braking. The average magnitude of current in each resistor grid is a measure of the braking effort of the associated motor.

During electrical braking, it is common in such systems to have the braking resistor grids connected in parallel circuit arrangement with the generating means. The generating means includes a controlled rectifier bridge circuit for coupling power from an alternator driven by the prime mover. The bridge circuit converts the AC power from the alternator to DC power for the electric motors. During regenerative electrical braking, the controlled rectifiers are controlled in a manner to convert the DC power generated by the electric motors into suitable AC power for driving the alternator as a motor. Retarding energy is dissipated in the braking resistor grids and by feeding energy into the alternator for driving the prime mover. The prime mover is generally connected not only to drive the alternator but to also power various vehicle accessories. During regenerative braking, retard energy drives the prime mover and powers the vehicle accessories resulting in a fuel savings.

The magnitude of available braking power during retard is the product of motor voltage and current. In order to maximize the retard effort of the electric motors, it is desirable to allow motor armature voltage to rise to a value sufficient to generate maximum safe motor current, generally restricted to the motor commutation limit. This voltage, at higher motor speeds, is greater than can be safely applied to the controlled rectifier bridge circuit requiring that the circuit be disabled at such higher motor speeds and thereby preventing the use of regenerative braking at higher speeds. It would therefore be desirable to provide a method and apparatus for allowing use of regenerative braking at higher motor speeds and reducing the use of dynamic braking resistor grids.

In control systems for the above described electric motors as well as others, it is common to use semiconductor controlled rectifiers (SCR) in the bridge circuit interconnecting the alternator and motor. One such bridge circuit may be used between an alternator primary winding and a motor armature while another bridge circuit interconnects an alternator tertiary winding and a motor field winding. The SCR's are gated or switched between conductive and non-conductive states in a well known manner in order to control the magnitude of current in the motor armature and field windings for regulating motor torque and polarity, i.e., forward and reverse rotation in propulsion and retard effort in electrical braking. In operation, the SCR's are switched such that all motor load current passes through the associated alternator winding. If the circuit can be operated in a manner to reduce the amount of load current through the alternator winding, the AC source rating can be reduced at a cost saving. Furthermore, the requirements for a smoothing reactor can also be reduced at a further savings.

SUMMARY OF THE INVENTION

The above and other desirable features, objects, and advantages will be in part pointed out and in part apparent from the description to follow. In general, the present invention provides a method and apparatus for allowing regenerative braking to be utilized at high motor speeds without increasing the voltage rating of the power conversion equipment and may reduce the power rating requirements of at least some power source equipment. In one form, the invention comprises a system for regenerative and dynamic electrical braking of an electrically powered traction vehicle, the vehicle including an alternating current (AC) power source connected to be driven by an internal combustion engine, a full wave controlled rectifier bridge circuit connected to electrical power output terminals of the power source for converting the output AC power to unidirectional current (DC) power, and at least one DC motor having an armature connected in electrical circuit with the rectifier bridge circuit. The system includes dynamic braking resistance means connected in series electrical circuit between the DC motor armature and the rectifier bridge circuit, and switching means connected in parallel circuit arrangement with the resistance means for selectively controlling introduction of the resistance means into the series electrical circuit. The electrical energy developed by the DC motor armature during electrical braking of the vehicle is selectively divided between regenerative and dynamic braking by control of the switching means. Since the dynamic braking resistance means can be connected in series with the power conversion or rectifier bridge circuit, the voltage at the rectifier circuit can be reduced to a level commensurate with the rating of the power conversion circuit thus allowing regenerative braking at a maximum level during high speed motor operation. Furthermore, since the resistance means can be placed in circuit with the power conversion means during maximum braking effort, there is less likelihood of an overcurrent condition caused by shoot-through in the bridge circuit. Still further, the requirements for a smoothing reactor during braking can be reduced since a portion of any ripple voltage may be dropped across the braking resistance means. Furthermore, regenerative braking can be utilized at lower braking levels and lower speeds by bypassing the resistance means.

In one form, the resistance means comprises a plurality of serially connected resistive elements and the switching means comprises a plurality of separately controllable switching devices. Each of the switching devices is connected in parallel circuit arrangement with a respective one of the resistive elements. The value of the resistance means is variable between minimum and maximum values by selectively energizing each of the switching devices to maximize the available amount of electrical energy transferable from the electric motor to the power source.

The invention further comprises a full wave, controlled rectifier bridge circuit electrically interconnecting a tertiary winding of the AC power source into a current supplying circuit with a field winding of the DC motor. Control means is connected to supply gating signals to the bridge circuit for selectively energizing controlled rectifiers therein in a manner to regulate the armature current generated by the motor in an electrical braking mode. The gating signals are applied to gate a first pair of rectifiers into conduction for coupling the AC source winding into circuit with the motor field winding for establishing a first preselected magnitude of current in the motor field winding. Thereafter, the gating signals are applied to another pair of the rectifiers such that the motor field winding current bypasses the AC source winding, the control means continuing to apply the gating signals to selected pairs of the controlled rectifiers such that the AC source winding is connected to the motor field winding only during intervals in which the polarity of voltage generated by the AC source winding is a preselected polarity. In so doing, the alternator is subjected to lower average current and may be downsized. Further, the output voltage waveforms are of a single polarity thereby reducing filter requirements.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
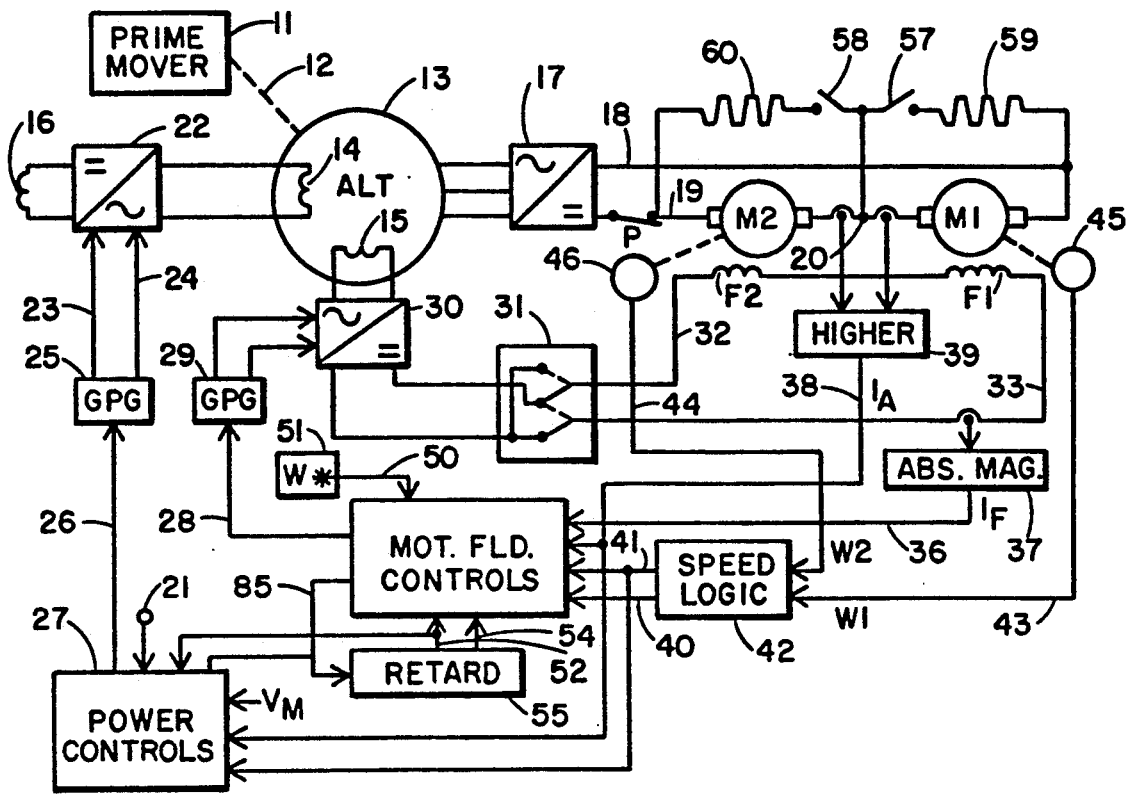
FIG. 1 is a functional block diagram of a dual-motor electric propulsion system of the type with which the present invention may be used.

The electric propulsion system that is shown in FIG. 1 is intended to be physically located on a self-propelled traction vehicle such as a large off-highway haulage truck. An operator controlled throttle (e.g., a foot pedal, not shown) is adapted to control the rotational speed (revolutions per minute) of a prime mover 11 which may, for example, be a diesel engine. The output shaft 12 of the engine is drivingly coupled to the rotor of an alternating current (AC) generator 13 (herein referred to as an alternator) which has a set of 3-phase main windings (not shown), a pair of auxiliary (tertiary) windings 14 and 15, and field windings 16. The shaft 12 of the engine is also coupled for driving other mechanical loads. The 3-phase generally sinusoidal alternating voltage that is generated in the main windings of the alternator 13 is converted to direct voltage by means of an uncontrolled full-wave rectifying bridge 17 whose output in turn is coupled, via lines 18, 19, and 20, to serially connected armatures of a pair of adjustable speed DC traction motors M1 and M2. The motors M1 and M2 have separately excited field windings F1 and F2, respectively. The rotors of these motors are respectively coupled through suitable speed reduction gearing to a pair of wheels (not shown) located on opposite sides of the vehicle. By suitably controlling the speed of the engine 11 and the excitation of the alternator and motor fields, the vehicle can be propelled (also known as "motoring") or dynamically retarded (also known as "electric braking") by its motors in either a forward or a reverse direction.

During the motoring mode of operation, the motors M1 and M2 will each rotate at a speed that depends on both the magnitude of excitation current in their fields F1, F2 and the magnitude of the voltage applied to their respective armature windings. The latter magnitude is a function of both the speed at which the alternator 13 is driven and the magnitude of excitation current in the alternator field 16. The alternator field excitation current is supplied by the auxiliary winding 14 of the alternator 13 via a single-phase, full-wave "phase controlled" rectifying bridge 22. Its magnitude depends on the timing of periodic firing signals that are supplied to the rectifier 22 over lines 23 and 24 from a conventional gate pulse generator 25 which is connected to an output line 26 of associated power control means 27.

The power control means 27 receives a first input signal representative of the voltage, $V_M$ at the output of the rectifying bridge 17, a second input signal representative of the current $I_A$ in the armature windings of the motors M1 and M2, a third input signal (from a terminal 21) that varies with the rotational speed of the engine 11, and the other inputs shown in FIG. 1. In the motoring mode, this control means is effective to produce on line 26 an output signal having a value normally representative of any magnitude error between a power feedback signal which is proportional to the product $V_M$ and $I_A$ and a load reference signal which varies as a function of engine speed. In the event of relatively high magnitudes of $V_M$, $I_A$, or motor speed, an overriding feedback signal proportional to the appropriate one of these parameters is substituted for the power feedback signal, and during the electric braking mode of operation a preselected constant reference signal is substituted for the aforesaid load reference signal. The output signal on line 26 controls the operation of the gate pulse generator 25 and thereby determines the magnitude of current in the field 16. As a result, the alternator field excitation is regulated in a desired manner.

As illustrated in FIG. 1, a motor field control means (labeled "MOT FLD CONTROLS") produces an independently variable control signal on an output line 28 which is connected to a conventional gate pulse generator 29. This generator supplies periodic firing signals to another single-phase, full-wave phase controlled rectifying bridge 30 connected between the second auxiliary winding 15 of the alternator 13 and the fields F1 and F2 of the motors M1 and M2. The two motor fields are connected in series with each other to the direct voltage output of the rectifier 30 via lines 32 and 33 and a polarity reversing switch 31. Thus, the auxiliary winding 15, the rectifier 30, and the associated gate pulse generator 29 comprise a separately controllable source of excitation current for the motor fields F1 and F2. This current has a variable average magnitude, and its direction in the motor fields depends on the position of the reversing switch 31. With the switch in its solid-line position, current flows from left to right through the field windings F1 and F2 as viewed in FIG. 1, and the motors rotate in a clockwise direction. On the other hand, with the switch 31 in its broken-line position, current flows from right to left through the field windings and the motors rotate in the opposite or counterclockwise direction.

The average magnitude of excitation current in the series-connected field windings F1 and F2 will depend on the value of the control signal that is supplied to the gate pulse generator 29 over the output line 28 of the motor field control means. The motor field control means receives input signals on seven different lines 36, 38, 40, 41, 50, 52, and 54, respectively. The input on line 36 is field current signal having a value that varies with the average absolute magnitude ($I_F$) of excitation current in the motor field windings F1 and F2. To derive this signal, the line 36 is coupled to a conventional current transducer in line 33 via suitable means 37 for converting the bipolarity output of the current transducer to a unipolarity voltage signal, on line 36, representative of $I_F$. More particularly, the electric potential on line 36, measured with respect to a predetermined reference potential (e.g., ground), has a magnitude proportional to the number of amperes flowing in line 33, and it has a relatively negative polarity of the transducer output signal is positive or negative with respect to ground.

The signal on the second input line 38 has a value that varies with the average magnitude of motor armature current $I_A$. To derive this signal, the line 38 is coupled via a higher magnitude selector 39 to a pair of current transducers which are respectively located in the connections from the line 20 to the armatures of the motors M1 and M2. As a result, the signal on line 38 is actually representative of the higher current magnitude in the armature windings of the two motors.

The signals on the third and fourth input lines 40 and 41 are speed feedback signals representative, respectively of the actual rotational speeds of the slower motor and of the faster motor. These signals are provided by a speed logic means 42 which in turn is coupled via lines 43 and 44 to a pair of conventional speed sensors 45 and 46 that are respectively associated with the rotors of the two motors M1 and M2. The output of speed sensor 45 is a signal W1 whose value varies with the angular velocity of the rotor of motor M1, and the output of the speed sensor 46 is a signal W2 whose value varies with the angular velocity of the rotor of motor M2. Preferably, each of the signals W1 and W2 is actually a train of discrete pulses of constant amplitude and duration but having a variable frequency directly proportional to the speed of the associated motor.

The fifth input line 50 originates at a block 51 which represents manually controlled means for providing a speed reference signal W* of preselected value, and the sixth and seventh input lines 52 and 54 originate at a retard command block 55. The latter block represents manually controlled means for producing on line 52 a predetermined command signal when dynamic retarding of the vehicle is desired and for providing on line 54 a braking signal having a value that depends on the degree of dynamic retarding that the operator of the vehicle desires. In response to the command signal being produced on line 52, conventional means (not shown) causes a pair of contactors 57 and 58 to close in unison, thereby connecting a first braking resistor grid 59 between lines 18 and 20 and concurrently connecting a second braking resistor grid 60 between lines 19 and 20. These resistor grids are used to dissipate the electric power output of the respective motors M1 and M2 which behave as generators during the electric braking mode of operation. The amount of braking torque exerted by the motors is a function of both the magnitude of $I_A$ and the magnitude of $I_F$. In this mode, $I_A$ varies with the voltage generated across the armature windings of the motor, and the magnitude of the generated voltage in turn is proportional to motor speed and field excitation. As previously explained, the magnitude of excitation current in the motor field windings depends on the value of the control signal on the output line 28 of the motor field control means.

Figure 2:
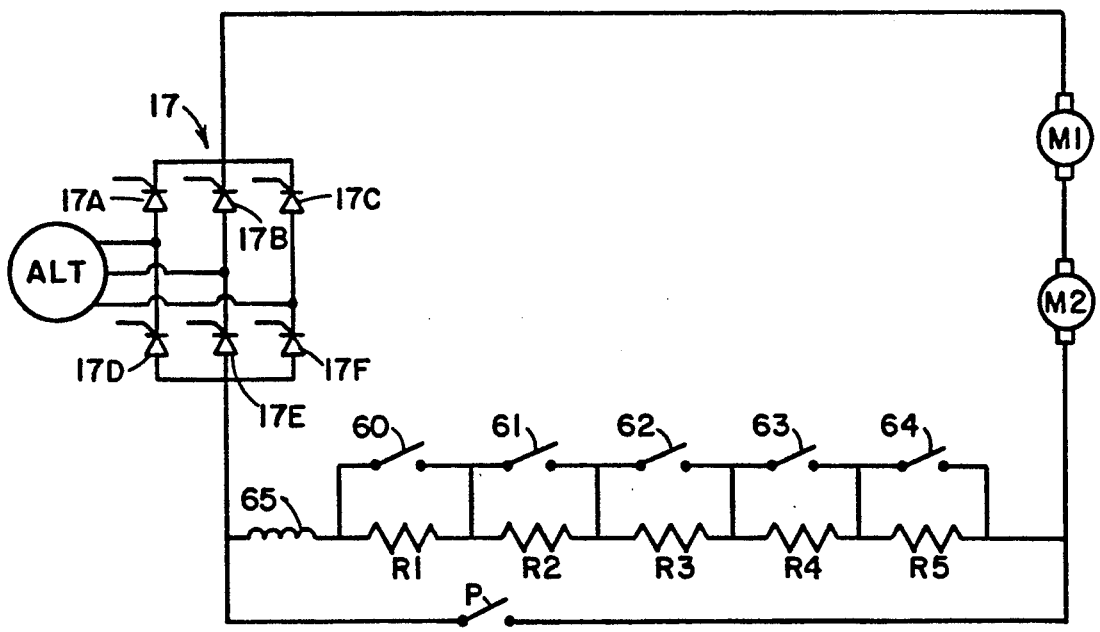
FIG. 2 is a simplified schematic representation of an electrical braking circuit in accordance with the present invention.

As can be seen in FIG. 1, the resistor grids 59 and 60 are connected in a parallel circuit path with the armature current convertor 17. In order to protect the convertor 17 from high magnitude armature voltage during electrical braking, it is necessary to inhibit controlled rectifiers in the convertor 17 or to open switch P, thus preventing the use of regenerative braking at higher motor speeds. Turning to FIG. 2, there is shown a simplified functional diagram of a dual motor system incorporating the teaching of the present invention to allow regenerative braking at all motor speeds. The motor armatures M1 and M2 are connected in a series circuit with convertor 17 through contactor P. However, the dynamic braking resistance means comprising resistor grids R1, R2, R3, R4, and R5 are connected in parallel with contactor P so that with contactor P in an open circuit position, the resistor grids can be connected into series circuit with convertor 17. Each resistor grid R1-R5 is bypassed by a corresponding contactor 60, 61, 62, 63, and 64. It will be apparent that selective actuation of the contactors 60-64 allows a selected amount or value of resistance to be inserted in the armature current path during electrical braking. This allows the available energy developed by the motors M1, M2 to be selectively distributed between dynamic and regenerative braking. At high motor speeds, some resistance can be inserted by opening selected ones of the contactors 60-64 to thereby reduce the magnitude of voltage appearing at convertor 17. The system thereby permits regenerative braking at high motor speeds to maximize the use of regeneration and conserve fuel costs.

In addition to the maximization of regeneration, the system also reduces the requirements for motor smoothing reactor (MSR) 65. While MSR 65 is not shown in FIG. 1, it is common practice to use such reactor to reduce ripple currents caused by gating of the semiconductor controlled rectifiers (SCR) 17A-17F in convertor 17 at discrete time intervals. The sizing of MSR 65 is reduced since at higher power levels some of the resistor grids R1-R5 are connected in series with convertor 17 thereby reducing the voltage drop across MSR 65. Another feature of the present invention is the inherent limitation on fault currents with resistor grids in series circuit with convertor 17. At higher motor speeds when higher armature voltage occurs, some of the grids R1-R5 will be in series circuit. If a shoot-through condition occurs, e.g., if SCR 17C and 17F both conduct simultaneously, current will be limited by the resistor grids. In general, it is desirable to control the contactors 60-64 as a function of motor speed, i.e., opening the contactors at higher speeds and selectively closing the contactors as speed reduces. This method allows use of maximum regeneration if the contactors are operated to only insert sufficient resistance to limit voltage at convertor 17 to the maximum which the convertor can withstand.

Figure 4:
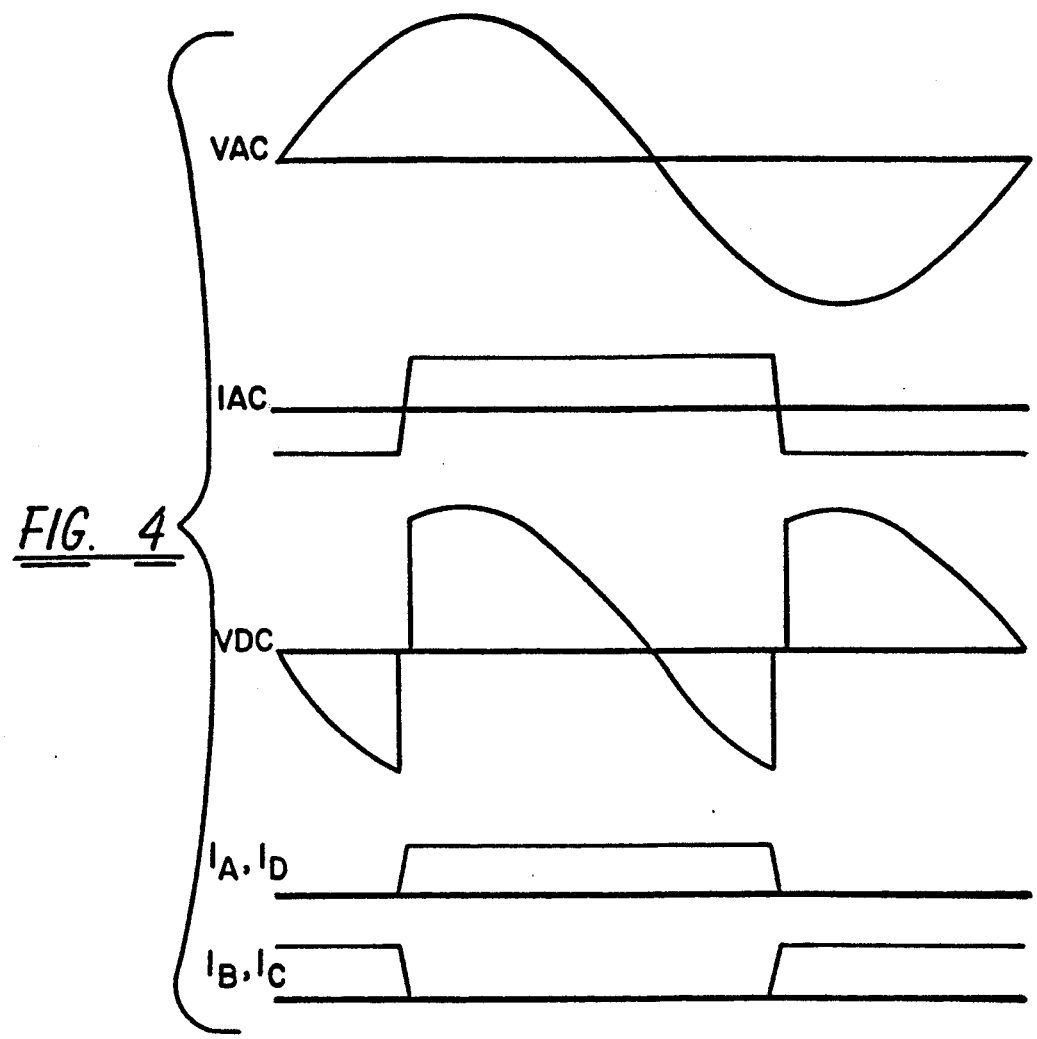
FIG. 4 is a graph of waveforms associated with operation of the circuit of FIG. 3 in a prior art method.
Figure 3:
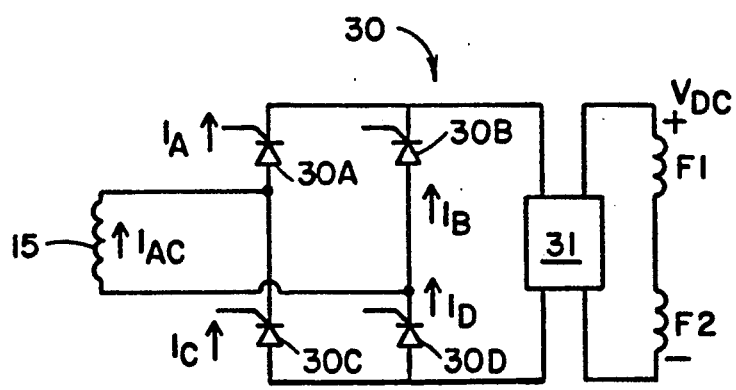
FIG. 3 is a schematic diagram of a phase control rectifier bridge circuit coupled in current supplying relationship to a motor field winding.

In some modes of operation of the system of FIG. 1, the convertor 17, 22, and 30 may be operated in a manner to further reduce the load current carrying requirements of alternator 13. For example, the field current convertor 30, shown in FIG. 3, may comprise a plurality of SCR's 30A, 30B, 30C, and 30D, each of which is gated into conduction at selected times for controlling the average current in field windings F1, F2. Referring to FIG. 4, the prior art method of control operates SCR's 30A and 30D as a common pair and SCR's 30B and 30C as another common pair. With SCR's 30A and 30D in conduction, current passes through winding 15 in a first direction. With SCR's 30B and 30C in conduction, current through winding 15 is in a reverse direction. This is shown by the graph of current $I_{AC}$ below the $V_{AC}$ waveform, where $V_{AC}$ represents the voltage developed across winding 15. The waveform $V_{DC}$ represents the voltage impressed on field windings F1, F2 during the conduction cycles. The current from each conduction cycle is shown as IA and IB, and illustrates a substantially constant field current.

Figure 5:
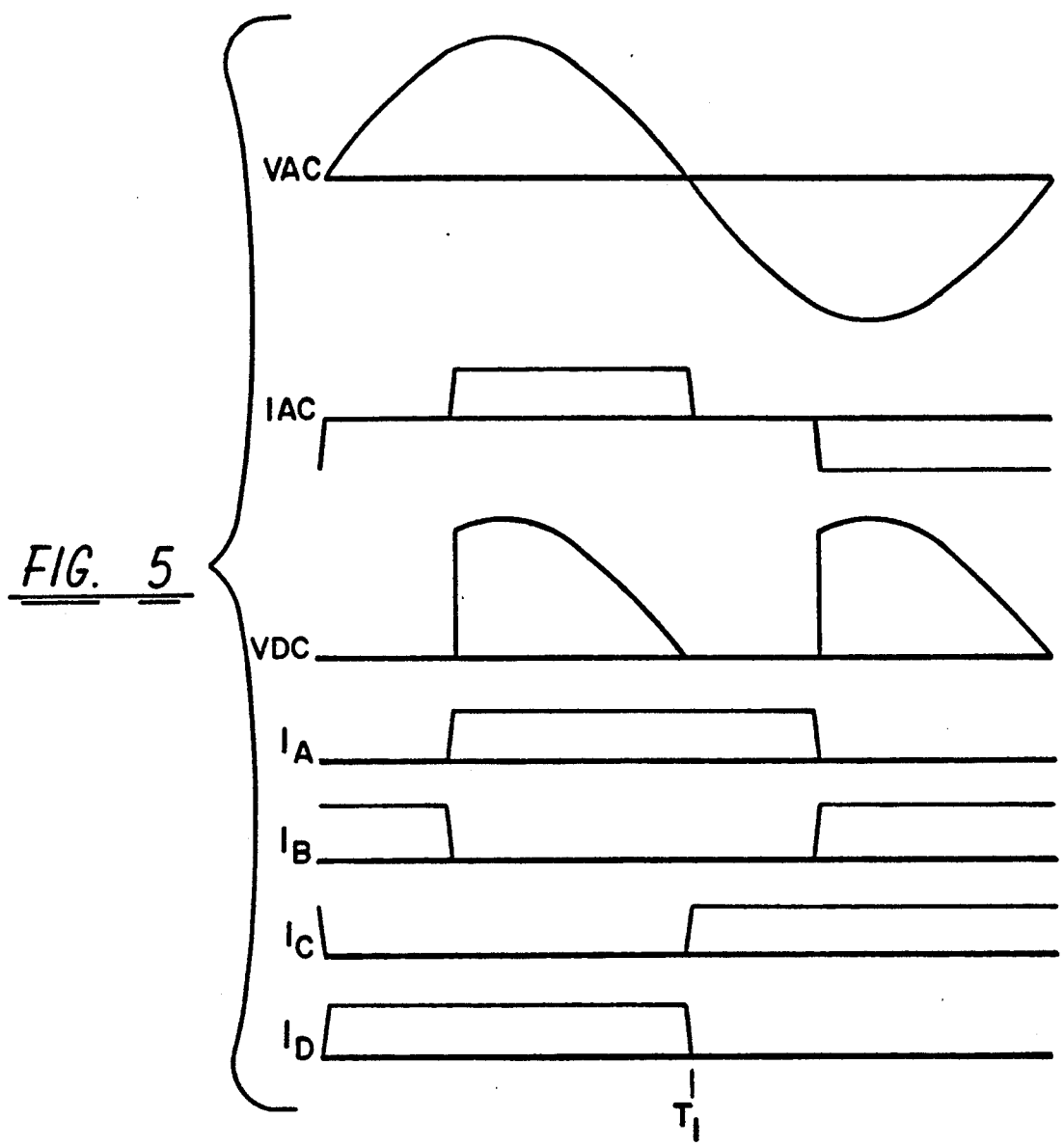
FIG. 5 is a graph of waveforms associated with operation of the circuit of FIG. 3 in accordance with the present invention.

By reference to FIG. 5, a preferred method of control is shown in which the SCR's 30A-30D are treated as four different pairs of SCR's rather than only two pairs. The current in each SCR 30A-30D is represented by current graphs IA, IB, IC, and ID, respectively. Assuming a first conduction pair to be SCR's 30A and 30D, current is driven by winding 15 with the voltage appearing across winding 15 corresponding to the waveform at $V_{DC}$. Note that only voltage of one polarity is impressed on the winding 15. When the voltage $V_{AC}$ reverses phase at time $t_1$, SCR 30C is gated into conduction forming a current path with SCR 30A which bypasses winding 15. Current through the SCR pair 30A and 30C is shown at IA and IC, respectively. In a next cycle, SCR 30B is gated into conduction forming a current path through winding 15 via SCR's 30C and 30B. The last cycle occurs when the voltage $V_{AC}$ again reverses phase and SCR 30D is gated into conduction to allow current to bypass winding 15 via SCR's 30B and 30D.

If the graphs of FIG. 4 and FIG. 5 are compared, it will be seen that current $I_{AC}$ in the conventional rectifier scheme always passes through the winding 15. The voltage $V_{DC}$ includes a negative component which is impressed on winding 15. These two effects require a higher rating of alternator 13 in order to dissipate heat energy attributable to the current. In addition, an MSR associated with the field windings is of similarly high capacity to smooth the ripple currents caused by such voltage reversals on the field windings. The inventive system of operation illustrated by FIG. 5 reduces the amount of ripple current and thus reduces the sizing of any associated MSR. Further, the winding 15 does not carry full current at all times and therefore can be downsized.

Figure 6:
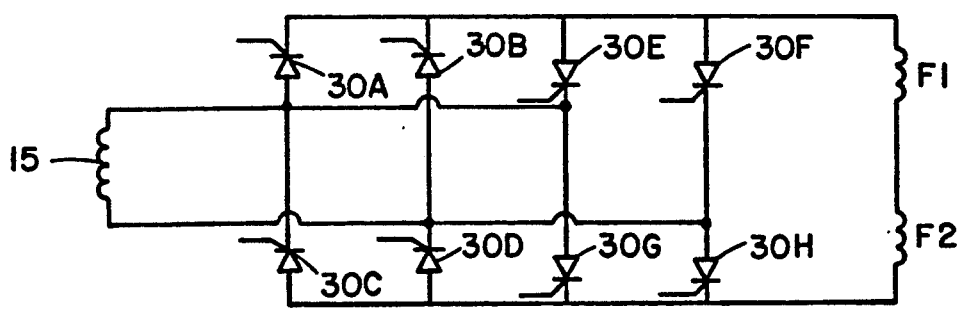
FIG. 6 is an improved version of FIG. 3 adapted for bidirectional current control.

The above operating method can also be applied to a motor field winding power source as shown in FIG. 6. Here, the reversing switch 31 has been eliminated and an extra set of SCR's 30E, 30F, 30G, and 30H incorporated. These latter SCR's are poled to conduct current in an opposite direction to the SCR's 30A-30D. Thus, if SCR's 30A-30D are used to conduct current in a direction for forward motor rotation, SCR's 30E-30H can be used to conduct current for a reverse motor rotation.

While the invention has been described in what is considered to be a preferred embodiment, various modifications and variations will become apparent. It is intended therefore that the invention not be limited to the disclosed embodiment but be interpreted within the full spirit and scope of the appended claims.

What is claimed is:

1. A system for regenerative and dynamic electrical braking of an electrically powered traction vehicle, the vehicle including an alternating current (AC) power source connected to be driven by an internal combustion engine, a full wave controlled rectifier bridge circuit connected to electrical power output terminals of the power source for converting the output AC power to unidirectional current (DC) power, and at least one DC motor having an armature connected in electrical circuit with the rectifier bridge circuit, the system comprising:
   dynamic braking resistance means operatively connected in series electrical circuit between the DC motor armature and the rectifier bridge circuit; and
   switching means, operatively connected in parallel circuit arrangement with the resistance means, for selectively controlling introduction of the resistance means into the series electrical circuit, the electrical energy developed by the DC motor armature during electrical braking of the vehicle being selectively divided between regenerative and dynamic braking by control of the switching means.

2. The system of claim 1 wherein the resistance means comprises:
   a plurality of serially connected resistive elements; and
   the switching means comprises:
   a plurality of separately controllable switching devices, each of the switching devices being connected in parallel circuit arrangement with a respective one of the resistive elements, the value of the resistance means being variable between minimum and maximum values by selectively energizing each of the switching devices to maximize the available amount of electrical energy transferable from the electric motor to the power source.

3. The system of claim 2 wherein the full wave controlled rectifier bridge circuit electrically interconnects a winding of the AC power source into a current supplying circuit with a field winding of the at least one DC motor.

4. The system of claim 3 further comprising:

control means connected to supply gating signals to the bridge circuit for selectively energizing controlled rectifiers therein in a manner to regulate the armature current generated by the motor in an electrical braking mode, the gating signals being applied to gate a first pair of rectifiers into conduction for coupling the AC source winding into circuit with the motor field winding for establishing a first preselected magnitude of current in the motor field winding, the gating signals thereafter being applied to another pair of the rectifiers such that the motor field winding current bypasses the AC source winding, the control means continuing to apply the gating signals to selected pairs of the controlled rectifiers such that the AC source winding is connected to the motor field winding only during intervals in which the polarity of voltage generated by the AC source winding is a preselected polarity.

5. A method for reducing ripple currents in a winding of an alternating current (AC) power generator connected in electrical circuit with a full wave controlled rectifier bridge circuit, output terminals of the bridge circuit being connected to supply unidirectional current (DC) to a field winding of an electric motor, control means coupled to the controlled rectifiers for selectively gating the rectifiers into conduction in a manner to regulate the polarity and magnitude of DC current in the field winding of the motor to preselected values, the method comprising the steps of:

gating a first pair of the rectifiers into conduction to couple the generator winding into series circuit with the motor field winding during a time period when the polarity of voltage developed by the generator winding is at a first preselected polarity for forcing current in a first preselected direction through the motor field winding; and gating a second pair of the rectifiers into conduction to shunt motor field winding current into a circulating current path bypassing the generator winding when the polarity of voltage developed by the generator winding is reversed from the first preselected polarity.

6. The method of claim 1 further comprising the steps of:

gating a third pair of the controlled rectifiers into conduction in a series current path with the motor field winding and generator winding such that current produced by the generator winding is forced through the motor field winding in the first preselected direction; and gating a fourth pair of rectifiers into conduction when the generator winding voltage changes to the first preselected polarity to shunt motor field winding current into another circulating current path bypassing the generator winding.

7. The method of claim 6 wherein the bridge circuit includes at least eight controlled rectifiers, at least four of the at least eight rectifiers forming a first group poled to conduct current in a first direction through the DC load and at least another four of the at least eight rectifiers forming a second group poled to conduct current in a second direction through the DC load, said step of selecting the gating of the controlled rectifiers to establish a predetermined polarity of current comprising the step of selectively gating into conduction the controlled rectifiers in one of said first and second groups for controlling the direction of current through the DC load.

8. A method for operating a full wave controlled rectifier alternating current (AC) to direct current (DC) power bridge circuit for minimizing ripple currents in a DC load, the bridge circuit including at least four controlled rectifiers for selectively coupling an AC source to the DC load in a manner to regulate load current through the DC load to a preselected value, the method comprising the steps of:

(a) gating a series combination of at least two controlled rectifiers into conduction for circulating load current through the DC load in a current path bypassing the AC source;

(b) selectively gating another of the controlled rectifiers into conduction for establishing a current path through the AC source for the load current;

(c) gating still another of the controlled rectifiers into conduction in series with the another of the controlled rectifiers for bypassing load current about the AC source when the AC source changes voltage polarity; and (d) alternately repeating the steps of selectively gating and gating still another of the controlled rectifiers at preselected times for regulating the DC load current to the preselected value.

9. The method of claim 8 further comprising the step of:

effecting a reduction in the RMS current through the AC source by shunting load current about the AC source during at least one half cycle of operation of the AC source.

10. The method of claim 9 further comprising the step of:

selecting the gating of the controlled rectifiers to establish a predetermined polarity of current through the DC load.

11. The method of claim 10 wherein the bridge circuit includes at least eight controlled rectifiers, at least four of the at least eight rectifiers forming a first group poled to conduct current in a first direction through the DC load and at least another four of the at least eight rectifiers forming a second group poled to conduct current in a second direction through the DC load, said step of selecting the gating of the controlled rectifiers to establish a predetermined polarity of current comprising the step of selectively gating into conduction the controlled rectifiers in one of said first and second groups for controlling the direction of current through the Dc load.

* * * * *